(12) United States Patent
Miyano et al.

(10) Patent No.: US 6,312,549 B1
(45) Date of Patent: Nov. 6, 2001

(54) OPTICAL DISK PASTING APPARATUS AND METHOD FOR PASTING OPTICAL DISKS

(75) Inventors: Ken Miyano; Noboru Murakami, both of Kanagawa; Yuichi Fujita, Tokyo; Masaaki Sano, Kanagawa, all of (JP)

(73) Assignee: Global Machinery Co., Ltd. (JP)

( * ) Notice: Subject to any disclaimer, the term of this patent is extended or adjusted under 35 U.S.C. 154(b) by 0 days.

(21) Appl. No.: 09/380,755
(22) PCT Filed: Mar. 10, 1999
(86) PCT No.: PCT/JP99/01147
    § 371 Date: Sep. 13, 1999
    § 102(e) Date: Sep. 13, 1999
(87) PCT Pub. No.: WO00/54265
    PCT Pub. Date: Sep. 14, 2000
(51) Int. Cl.[7] .................................................. G11B 7/26
(52) U.S. Cl. .................................... 156/286; 156/382
(58) Field of Search .................................. 156/285, 286, 156/381, 382; 369/286; 428/64.4

(56) References Cited

U.S. PATENT DOCUMENTS 5,744,193 * 4/1998 Kitano .................................. 427/162
5,993,592 * 11/1999 Perego ................................. 156/292

FOREIGN PATENT DOCUMENTS

| | | |
|---|---|---|
| 3-245331 | 10/1991 | (JP) . |
| 5-20713 | 1/1993 | (JP) . |
| 5-20714 | 1/1993 | (JP) . |
| 8-273213 | 10/1996 | (JP) . |
| 8-293131 | 11/1996 | (JP) . |
| 9-44917 | 2/1997 | (JP) . |
| 9-198720 | 7/1997 | (JP) . |
| 9-320132 | 12/1997 | (JP) . |
| 11-66644 | 3/1999 | (JP) . |
| 11-66645 | 3/1999 | (JP) . |

* cited by examiner

*Primary Examiner*—Jeff H. Aftergut
*Assistant Examiner*—John T. Haran
(74) *Attorney, Agent, or Firm*—Nixon Peabody LLP; Thomas W. Cole

(57) ABSTRACT

An optical disk pasting apparatus 1 for pasting two disks by overlapping the second disk D2 on the first disk D1 on which an adhesive agent 4 is coated, is featured in that said second disk D2 is overlapped on the first disk D1 while adsorbing and holding said second disk D2 by warping so that the second disk is swelled in a direction (the direction of the arrow X) opposite to the first disk D1 side opposed the second disk D2, wherein closed space 5 formed between both disks D1 and D2 is vacuumed and attracted by bringing the outside areas of the first disk D1 and the second disk D2 in contact with each other.

11 Claims, 9 Drawing Sheets

OPTICAL DISK PASTING APPARATUS AND METHOD FOR PASTING OPTICAL DISKS

TECHNICAL FIELD

The present invention relates to an optical disk pasting apparatus and method for pasting optical disks, and in particular an optical disk pasting apparatus and a method for pasting optical disks which, when an optical disk adsorbed and held by an arm is caused to overlap on another optical disk which is placed on a disk table and is coated with an adhesive agent, is constructed so that closed space is formed between the two disks and is capable of pasting the two disks flatly without any air bubbles being mixed in the above-mentioned adhesive agent by vacuuming the closed space.

BACKGROUND OF THE INVENTION

Conventionally, in connection with a two optical disk pasting apparatus and a method for pasting the same, various types of technologies have been developed and proposed, wherein a chamber provided so as to enclose a pasting apparatus itself is made vacuum.

For example, the first technique disclosed in Japanese Laid-open Patent Publication No. 273213 of 1996 and the second technique disclosed in Japanese Laid-open Patent Publication No. 198720-1997 are listed. Hereinafter, a detailed description is given of these conventional arts.

The first technique (Japanese Laid-open Patent Publication No. 273213 of 1996) shown in FIG. 7 is an art developed so as not to thicken the outer circumference of a disk due to a protection film.

That is, in a method and an apparatus 20 for producing pasted disks which the adhered surfaces of a pair of one-sided disks 21 and 22 are butted to each other and pressure-fitted after forming a projection film on a reflection film of the pit surface of the pair of one-sided disks 21 and 22 to be pasted together and coating an adhesive agent to the pasting surface of at least one of the one-sided disks, the space 28 in a vacuum chamber 26 is vacuumed by a vacuum pump (not illustrated), using a vacuum tank having such a size so as to cover pressure-fitting tables 25 and 26*a* to make the inside of the vacuum chamber 28 vacuum. Thereafter, by causing the pressure-fitting table 24 secured to a rod 29 to fall down, the outer circumferential portion 27 of the disks 21 and 22 is first pressure-fitted by ring-like projections 25 and 26 formed on the pressing surface of the upper and lower pressure-fitting tables 23 and 24, and next, the entire surfaces of the disks 21 and 22 are adhered to each other.

The second technique (Japanese Laid-open Patent Publication No. 198720-1997) shown in FIG. 8 is an art developed for an object for more effectively removing air bubbles which may be mixed in an -adhesive agent of the pasted disks 31 or in the disk 31.

That is, in the pasting method of an overlapped disk 31, the overlapped disk 31 placed between an upper press plate 37 secured at an axial portion 39 and a lower press plate 38 is positioned in closed space 33 formed by covering a chamber 32 in a compression device 30, wherein when vacuuming the closed space 33 by a vacuuming tube 34, O rings 35 which seal the chamber 32 are deformed by pressure given from the outside to the rigid chamber 32, which forms the closed space 33, and the overlapped disk 31 is compressed equivalent to a decrease in the sealing interval 36 in line with the deformation of the O rings 35. Thereby, air suction resulting from the vacuuming is to suck air bubbles in the adhesive agent of the overlapped disk 31.

In addition, the third technique disclosed in Japanese Laid-open patent publication No. 245331 of 1991, which is illustrated in FIG. 9, is an art developed in order to exclude air bubbles in the adhesive agent, devise so as to make the thickness of the adhesive agent uniform, and maintain the flatness of the disks 43 and 44 in a good state.

That is, the technique is an art in which an adhesive agent is coated to at least one of a pair of disks 43 and 44, the pair of disks 43 and 44 are faced to each other so that the surface on which the adhesive agent is coated comes inside, and at least one of the disks 44 is deformed by warping so that the center portion is swelled toward the disk 43 side. The pair of disks 43 and 44 are adhered to each other from the center portion to the outer circumferential side one after another. Accordingly, the pair of disks 43 and 44 cemented at their entire surfaces are compressed and pasted to each other.

However, the abovementioned conventional arts are inherently bound with the following problems and shortcomings. That is, in the first and second conventional arts, since vacuum chambers 26 and 32 having a greater capacity such that they can cover the disk plate are employed, the device itself becomes large-scaled, and the production cost is increased. Further, in these types of vacuum chambers 26 and 32, since the inner capacity is great, it is necessary to increase a vacuuming force, wherein a lengthy period of suction (vacuuming) is required in order to get an appointed pressure condition, and the working efficiency is incorrect.

In addition, with the third technology, since a means for warping one disk 44 and pasting the disks 43 and 44 together is employed, a certain effect can be obtained with respect to removal of air between the disks 43 and 44. However, in connection with effective removal of air bubbles mixed in an adhesive agent, removal is not sufficient in that the time required for causing the disk 44 to overlap on the disk 43 is slow, and air sufficiently exists in the surrounding of the disks 43 and 44.

Therefore, it is an object of the invention to provide an optical disk pasting apparatus and a method for pasting optical disks which, in view of effectiveness of a vacuum suction technique in a disk pasting art, can achieve the vacuum suction by a simple construction and can prevent air bubbles from being mixed in an adhesive agent.

DISCLOSURE OF THE INVENTION

The following inventions are employed in order to achieve the following objects.

An optical disk pasting apparatus in accordance with the present invention includes an apparatus disk, whereby a second disk is caused to overlap on a first disk to which an adhesive is coated to paste the two disks together, wherein the second disk is attracted and held by being warped so that the second disk is swelled in the direction opposite to the first disk side opposite to the second disk, and the second disk is caused to overlap on the first disk. And, by bringing the outside am of the first disk and the second disk into contact with each other, closed space formed between both disks is made into a vacuum.

In the invention, since the face of the second, which faces the first disk, is attracted and held so that it is swelled to the side opposite to the first disk, and the second disk is caused to overlap on the waiting first disk disposed on a disk table, a space shaped so that a dish is upside down is created between the first disk and the second disk.

If the space is clogged and closed from its surrounding, and air in the corresponding space is vacuumed, the closed space can function as a vacuum chamber, wherein the second disk is attracted to the first disk side and is adhered on the adhesive agent coated on the first disk. Further, the closed space is remarkably smaller in capacity that that of the conventional vacuum chamber, and vacuuming can be carried out in a short time.

In addition, according to the vacuuming of the closed space formed between the first disk and the second disk, since the second disk can be quickly adhered on the adhesive agent coated on the first disk, no air bubbles can be mixed into the adhesive agent.

In addition, it is not necessary to have a large-scaled vacuum chamber which is formed so as to cover the entirety of members surrounding the disks such as a table, an arm, etc., which has disks placed thereon and holds the disks.

An optical disk pasting apparatus in accordance with the present invention is constructed so that the second disk is attracted and held by an arm having a disk holding portion on which a ring-like projection brought into contact with the outside area of the corresponding second disk and the ring-like second disk an on portion which attracts the area in the vicinity of the center hole of the corresponding second disk, are formed, whereby the second disk is caused to overlap on the corresponding first disk. Accordingly, since the second disk is attracted at a position where the end face of the corresponding second disk attracting portion is retracted from the projection end face, the second disk is swelled in the direction opposite to the first disk side direction facing the second disk.

In the invention, the disk holding portion of an arm which attracts and holds the second disk and functions to cause it to overlap on the first disk can effectively display an action by which the second disk is warped so that the second disk is swelled in the direction opposite to the first disk facing the second disk.

That is, since the ring-like second disk attraction portion secured at the same disk holding portion takes an action of attracting the inside area of the second disk to the arm side while the ring-like projection secured at the disk holding portion is brought into contact with the outside area of the second disk and operates so as to maintain the outer circumferential position of the second disk, the second disk can be warped in a state that a dish is inversed upside down.

In accordance with the present invention, the warped inner circumferential wall surface of the center hole of the second disk attracted and held at the disk holding portion is brought into contact with the outer circumferential portion of the center pin which is formed at the middle of the disk table, on which the first disk is placed, and is inserted into the center hole of the corresponding first disk, thereby forming the abovementioned closed space.

In the invention, since the inner circumferential wall surface of the center hole of the second disk is brought into contact with the outer circumferential portion of the center pin without any clearance, the closed space formed between the first disk and the second disk can be securely enclosed and sealed, whereby the capacity of the closed space can be made as small as possible, and the sealing thereof can be secured. Therefore, a vacuuming can be quickly carried out.

In accordance with the present invention, the inside space surrounded by the second disk attraction portion is formed so that it can be enclosed and sealed when the inner circumferential wall surface of the center hole of the second disk is brought into contact with the outer circumference of the center pin.

In the invention, even in a case where should any space be formed at a contacted portion when the inner circumferential wall surface of the center hole of the second disk retained by the arm is brought into contact with the outer circumference of the center pin, the sealing of the closed space formed between the first disk and the second disk can be secured by clogging the inside space surrounded by the second disk attraction portion, which communicates with the corresponding space, whereby a vacuuming can be securely carried out.

In accordance with the present invention, the closed space is vacuumed through a vacuuming hole formed at the center pin.

In the invention, since a vacuuming hole which communicates with the closed space is provided at the center pin, the outer circumferential surface of which faces the inside of the closed space formed between the first disk and the second disk, the conventional shape of a disk table can be used as it is, and a vacuuming can be carried out by a simple means.

The present invention is provided with a means for controlling and adjusting the intensity of a vacuuming force from a negative attraction hole of the center pin, which adsorbs the second disk with respect to the disk attraction force of the second disk attraction portion of the arm.

In the invention, it is possible to adjust, by a simple means, the speed, time for the second disk opposite to the first disk via the closed space, to separate from the second disk attraction portion by vacuuming of the closed space and to move to the first disk side, and the compression force onto an adhesive agent on the first disk.

That is, by a simple means in which only the vacuuming force is changed while constantly maintaining the disk attraction by the second disk attraction portion, it is possible to freely change the intensity of the vacuuming force with respect to the disk attraction force.

In accordance with the present invention, a method for pasting two optical disks by causing the second disk to overlap on the first disk on which an adhesive agent is coated, comprises the steps of; holding the second disk, in which the second disk is attracted and held, by warping so that the second disk is swelled in the direction opposite to the confronting first disk side; overlapping disks, in which the outside area of the attracted and held second disk is brought into contact with the outside area of the first disk; vacuuming and attracting air in the closed space formed between the first disk and the second disk; and causing the second disk to be placed onto an adhesive agent coated on the first disk by the vacuuming and attracting step.

In the invention, since a step for adsorbing and vacuuming the closed space of a small capacity in addition to a step of forming a closed space between the first disk and the second disk, it is possible to quickly paste the second disk onto an adhesive agent coated on the first disk.

In accordance with the present invention, the step of vacuuming and attracting is to vacuum and attract the center pin of the disk table, which is inserted into the first disk and faces inside the closed space, by a negative attraction hole opened and formed at the outer circumferential portion of the center pin.

The invention is constructed so that the outer circumferential portion of the center pin of a disk table facing the inside of the closed space is effectively utilized, a negative attraction hole is provided at the corresponding outer circumferential portion, and a vacuuming is carried out for the closed space, the invention can provide an optical disk pasting method of a simpler structure.

In accordance with the present invention, a step for controlling and adjusting the vacuuming force from the negative attraction hole with respect to a disk attraction force of the second disk is provided in the step of vacuuming.

In the invention, in the vacuuming step, by adjusting the intensity of the vacuuming force, it becomes possible to adjust, by a simple means, the speed, the time for the second disk to separate from the second disk attracting portion by a vacuuming of the closed space and to move to the first disk side, and the compression force onto an adhesive agent on the first disk with respect to the first disk.

In accordance with the present invention, in a disk pasting step of an optical disk pasting method, the arm is moved so as to separate from the disk table when the second disk is pasted onto the adhesive agent.

With the invention, flatness of the second disk can be secured by avoiding interference of the arm member when the second disk is brought into contact with the adhesive agent on the first disk.

In accordance with the present invention, the disk table is turned when the second disk is brought into contact with the adhesive agent in the disk pasting step.

With the invention, a centrifugal force resulting from rotations of the disk table operates so as to widen the adhesive agent, thereby making the thickness of the adhesive agent uniform, and securing the flatness of the disks.

BRIEF DESCRIPTION OF THE INVENTION

FIG. 1 is a view for simply illustrating flows in a pasting and adhering step of optical disks, FIG. 2 is a longitudinally sectional view showing a general construction of an optical disk pasting apparatus 1 according to the invention, FIG. 3 is a view showing the peripheries of an arm 3 for holding the second disk and a disk plate 2 for fixing the first disk in the same apparatus, which shows a state where the arm 3 holds the second disk and is positioned above the disk plate 2, FIG. 4 is a partially sectional view of the arm 3, FIG. 5 is a view showing that the arm 3 holds the second disk and approaches above the disk plate 2, the outside area of the first disk D1 is brought into contact with the outside area of the second disk D2, and closed space 5 is formed between both disks D1 and D2, FIG. 6 is a view showing that the second disk D2 is overlapped, via an adhesive agent, on the first disk D1 secured on the disk plate 2, and at the same time, the arm which releases the second disk D2 is moving upward;

BEST MODE FOR CARRYING OUT THE INVENTION

Hereinafter, a detailed description is given of the preferred embodiments with reference to the accompanying drawings.

An optical disk production process of a DVD (digital video disk), etc., is complete with an optical disk pasting step, a disk adhering step (adhesive agent hardening step), and an inspection step in continuation with a disk molding and cooling step, and a sputtering step (recording film and reflection film forming step). The invention relates to an optical disk pasting step in the above optical disk production process.

Figure 1:
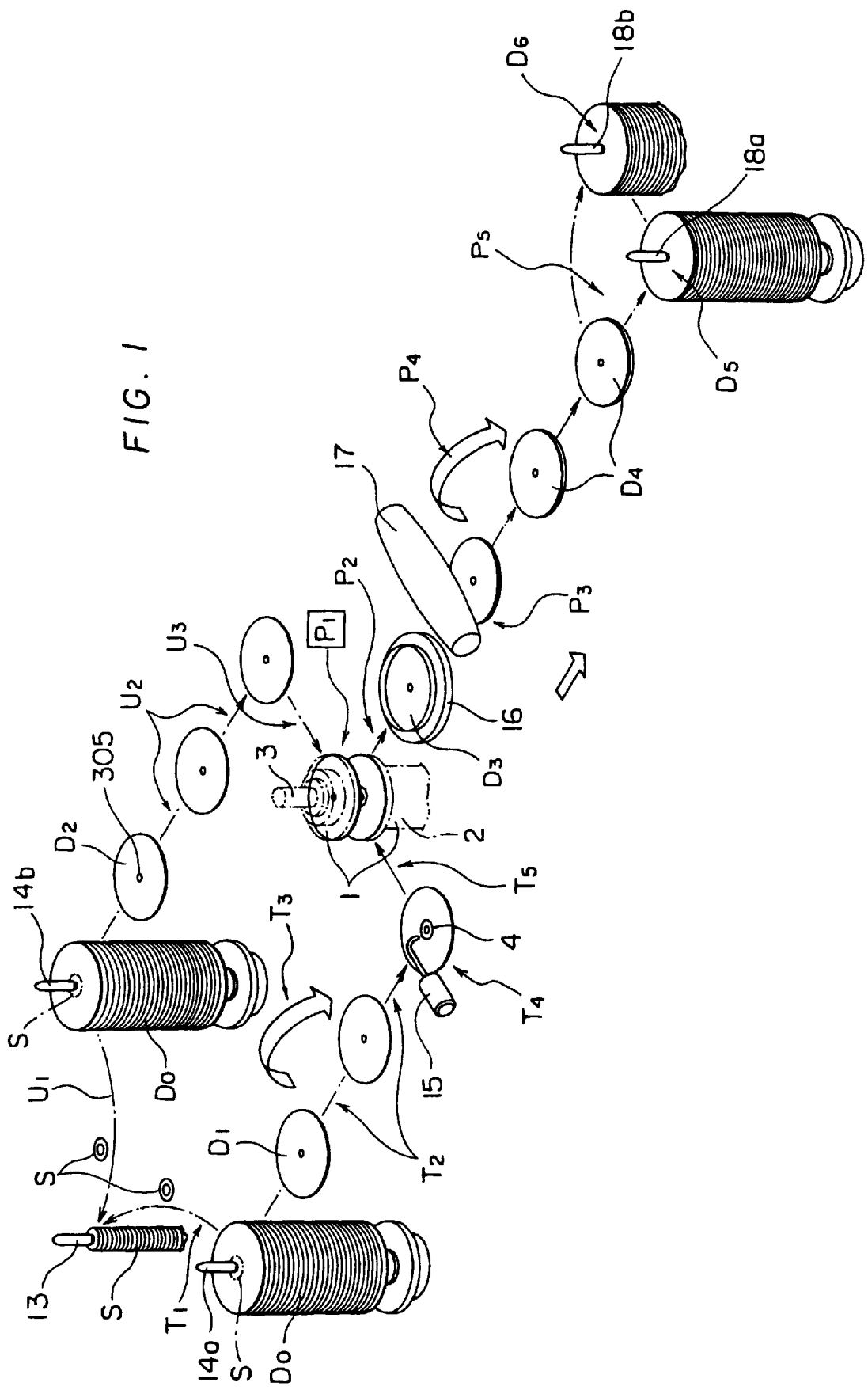

First, a brief description is given of a flow in the optical disk production process surrounding the optical disk pasting step on the basis of FIG. 1.

Optical disks (hereinafter called "disk") which pass through the spattering step (not illustrated), are made into a disk D0 as a set consisting of a pair of disks with juxtaposed disk stack poles 14a and 14b, and then laminated.

The optical disks D0 are sets of upper and lower disks, each consisting of a pair, which are laminated with their reading surface faced upward, wherein a small-disk-shaped spacer S is caused to intervene between the disks. Also, the spacer S take the role of separating the upper and lower overlapped disks from each other at a thickness of the spacer S, whereby the upper and lower disks can be prevented from being damaged due to contacting, etc., and at the same time, it becomes easier to attract disks one by one and to transfer the same to subsequent transfer steps (U2 and T2).

Disks of the respective disks D0 laminated on stack poles 14a and 14b remain with their reading surface faced upward and are moved to a disk transfer table (not illustrated) adjacent to the respective stack poles 14a and 14b. Subsequently, the disks are transferred toward a subsequent disk pasting apparatus 1 on a transfer rail (not illustrated) (Transfer steps U2 and T2).

Herein, since the transfer step T2 is a step where the second disk on which an adhesive agent 4 is coated is provided into a disk pasting apparatus 1, the disks are inversed on the way to the step T2 so that the reading surface thereof is faced downward (that is, the recording surface is faced upward) (a disk inversing step illustrated by reference symbol T3), and the disks are moved to an adhesive agent coating step T4. That is, no adhesive agent 4 is coated on the reading surface.

Thus, disks transferred and provided by the transfer step T2 are made into the first disks D1 waiting below the a subsequent disk pasting apparatus 1 and having the upper surface coated with an adhesive agent 4, and disks transferred and provided by the transfer step U2 are made into the second disks D2, which will be overlapped by an appointed method (described later) from above the first disks D1, in the optical disk pasting apparatus 1.

Also, spacers S of the respective disks D0 are attracted and transferred by an appointed arm (not illustrated) and laminated one after another (steps illustrated by reference symbols U1 and T1) with respect to exclusive spacer stack poles 13 disposed equidistantly from the stack poles 14a and 14b.

Next, in an adhesive agent coating step T4, the adhesive agent 4 is circumferentially coated, by an appointed nozzle 15, on the upper surface (recording side) of the first disk D1 while slowly turning the first disk D1. Also, the adhesive agent may be adequately selected. However, in the preferred embodiment, an adhesive agent made of ultraviolet ray hardening resin is used.

The first disk D1 on which the adhesive agent 4 was coated is placed, by a transfer arm (not illustrated), on a disk table 2 which constitutes a disk pasting apparatus 1 (a disk transfer step illustrated by reference symbol T5), and waits for arrival of the second disk D2.

On the other hand, the second disk D2 is attracted and held in an appointed shape (described later) by an arm 3 which constitutes a disk pasting apparatus 1, via a disk transfer step U2 performed by a transfer rail (not illustrated), and is caused to move onto the disk table 2 on which the first disk D1 is placed.

And, disks D3, which are formed via a disk pasting step P1 described in detail later, that is, created by pasting the first disk D1 and the second disk D2 together via the adhesive agent 4, are moved to an adhesive agent hardening table 16 (a transfer step illustrated by reference symbol P2), and come below an ultraviolet ray irradiation lamp 17.

The disks D3 are pressure-fitted to each other while securing the flatness of the disks to cause the adhesive agent 4 intervened between the disks D1 and D2 to be widened, and at the same time, a ultraviolet ray is irradiated onto the adhesive agent 4 by the lamp 17 to cause the adhesive agent 4 to be hardened. Finally, the disks D3 are adhered and fixed to each other (Ultraviolet ray irradiation step illustrated by reference symbol P3).

Disk D4 in which two disks are adhered to and fixed to each other are reversed (a reversing step illustrated by reference symbol P4) so that the reading surface comes upward and enters an inspection step P5. In the inspection step P5, the adhering condition and flatness of the two disks D1 and D2 are judged so as to classify as non-defective disks D5 and D6, wherein the former non-defective disks D5 are placed on a stock table 18a, and the non-defective disks D6 are placed on a stock table 18b.

Hereinafter, a description is given of preferred embodiments of a disk pasting apparatus and a method for pasting the same according to the invention in the disk pasting step P1.

Figure 2:
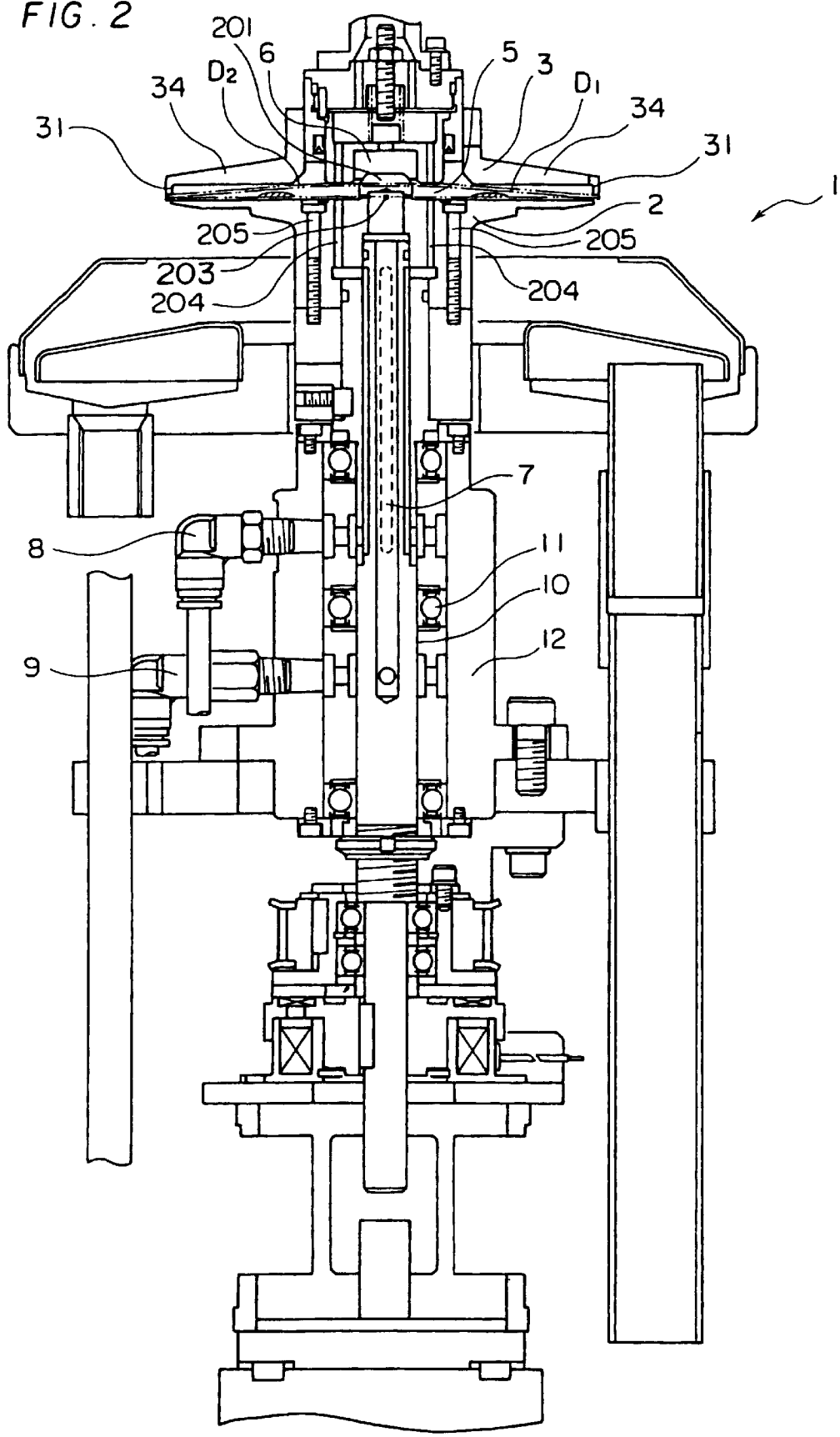

First, FIG. 2 is a longitudinally sectional view showing a general construction of the disk pasting apparatus 1, wherein the apparatus 1 is composed of a disk table 2 placed downward, the section of which is roughly T-shaped, and an arm 3 disposed upward of the corresponding disk table 2.

A roughly columnar center pin 201 having a flat head is provided at the center of a flat table surface 202 of the disk table 2. The center pin 201 is positioned by being inserted into a center hole 305 of the first disk D1 which will be transferred after being coated with the adhesive agent 4, whereby the first disk D1 is placed on the table surface 202.

A plurality of vacuuming holes 203 (four holes in FIGS. 2, 3, and 5) are equidistantly provided circumferentially so as to become open to the lower part of the outer circumferential portion 2011 of the center pin 201, in detail the part facing the upper side by at least the thickness of the first disk D1 at the lower portion of the outer circumferential portion 2011. The respective vacuuming holes 203 are caused to communicate with an attracting channel 7 cylindrically formed in the vertical direction in a shaft 10 which supports the disk table 2.

Herein, reference number 8 indicates an attracting member secured at the attracting channel 7, and reference number 9 indicates an attracting member for attracting air from a disk fixing attraction hole 204 which is open to the upper surface 202 of the table. Vacuuming attraction of the closed space 5 via a vacuuming attraction hole 203 and attraction from the disk fixing attraction hole 204 are carried out while measuring the vacuum degree by a separate vacuum sensor (not illustrated), whereby it is devised that the vacuum attraction force of the vacuuming attraction hole 203 can be independently adjusted.

Also, reference number 12 indicates a housing for holding a shaft 10, reference number 11 indicates a bearing for rotatably supporting the shaft 10, and reference number 205 indicates a screw for attaching the tale.

Figure 3:
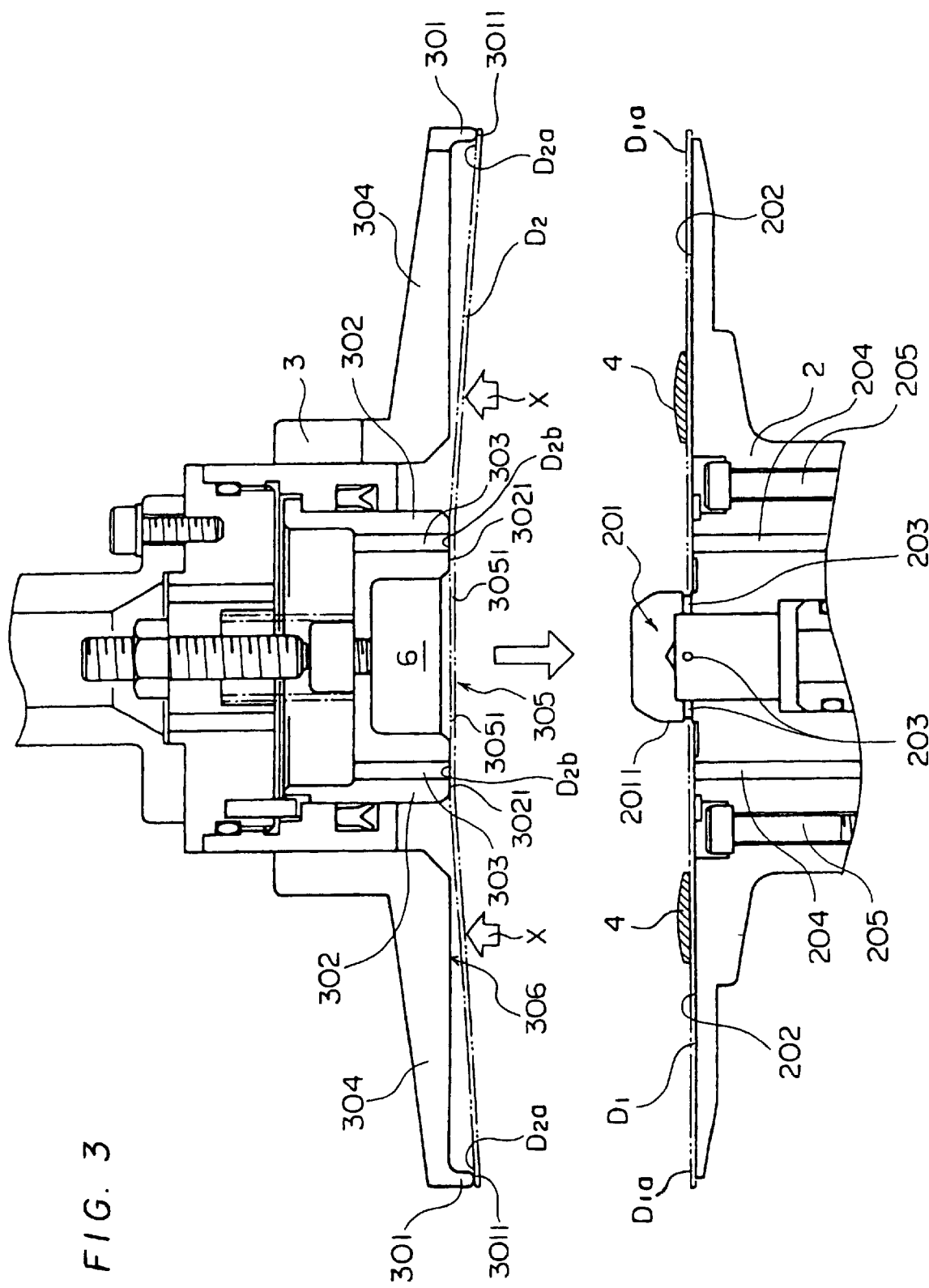

In addition, FIG. 3 shows, in enlargement, a state wherein the arm 3 attracts and holds the second disk D2 and the arm 3 is opposite above the disk plate 2 on which the first disk D1 is placed.

The arm 3 is roughly inversed T-shaped, and a disk holding portion 306 which takes the role of attracting and holding the second disk D2 is formed at the underside of the roughly disk-like widened lower end portion 304 of the corresponding arm 3, so that the disk holding portion 306 comes opposite to the disk placing surface 202 of the disk plate 2.

A projection 301 formed like a ring is provided downward at the extreme outer circumferential portion of the disk holding portion 306. Further, the second disk adsorbing portion 302 projecting like a ring is formed inwardly in the center direction of the disk holding portion 306.

A ring-like attraction hole 303 which attracts, in negative pressure, the upper surface D2b of an area slightly outside of the center hole 305 of the second disk D2 is formed at the second disk attraction portion 302 so as to pass through the second disk attraction portion 302 in the vertical direction.

Figure 4:
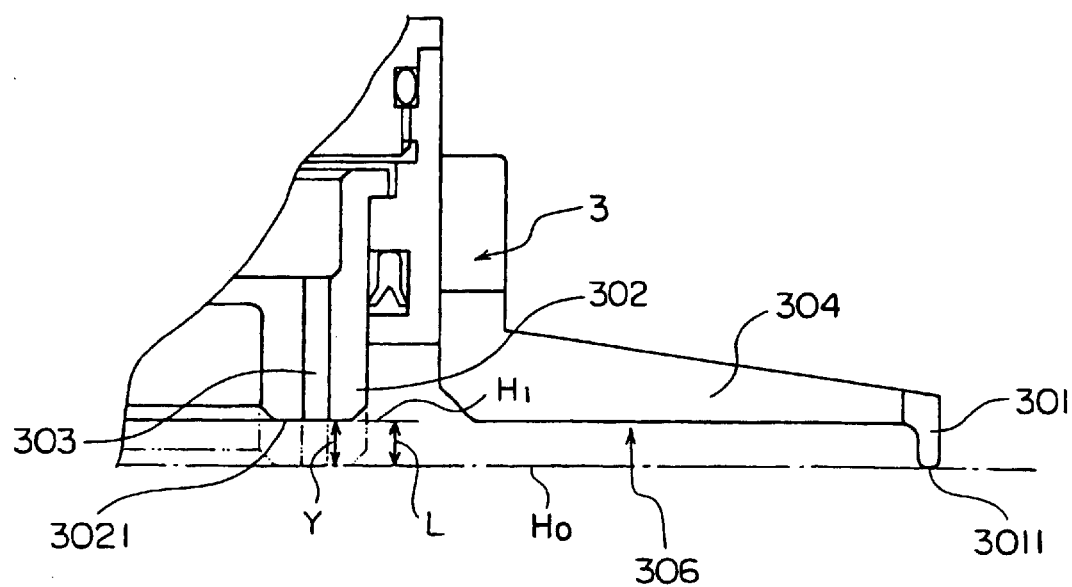

Herein, the end face 3021 of the second disk adsorbing portion 302 is supported by the arm 3 and disposed so that the end face 3021 can move from the same height position HO as that of the end face 3011 of the abovementioned projection portion 301 to the position H1 further retracted upward. At the position H1 further retracted upward, the heights of the respective end faces 3011 and 3021 produce a gap equivalent to a length indicated by reference symbol L as shown in FIG. 4.

Although the length of the reference symbol L may be adequately established, in the preferred embodiment, it is established so that the L becomes 1.5 mm (L=1.5 m). This is a preferable length in order to prevent deformation of the disk D2 as much as possible so that no surplus load is given to the second disk D2 and to form closed space 5 (described later) of an appropriate capacity.

In addition, up and down movement (See the arrow mark indicated by reference symbol Y in FIG. 4) of the second disk attracting portion 302 is constructed so that the length of reference symbol L can be secured up to 3 mm at maximum, whereby it is possible to adjust the capacity of the closed space 5.

By the construction of the disk holding portion 306, the second disk D2 can be attracted and held at the disk holding portion 306 in the form that the second disk D2 is warped so as to expand in the opposite direction )the direction of the arrow X indicated in FIG.3) of the first disk D1 side facing the corresponding second disk D2.

Further, in detail, since the upper surface D2a at the extreme outside of the second disk D2 is brought into contact with the projection 301 and at the same time the upper surface D26 at an area slightly outward of the center hole 305 of the second disk D2 is attracted by the second disk attracting portion 302, the inside area of the second disk D2 is attracted upward, and is temporarily deformed like a dish which is inversed upside down. Also, the second disk D2 used in the invention may be applicable to either of a disk having a recording film formed or a disk not having a recording film formed.

Next, an adhesive agent 4 of ultraviolet ray hardening type resin is circumferentially coated on the upper surface of the first disk D1 placed on the disk table 2 and waiting for arrival of the second disk D2. If surrounding air is included and mixed between the second disk D2 and the adhesive agent 4 when the second disk D2 is placed on the adhesive agent 4, it will cause an obstacle in reading the recorded surface by a laser beam. Therefore, in the invention, a disk pasting method described below is employed.

Figure 5:
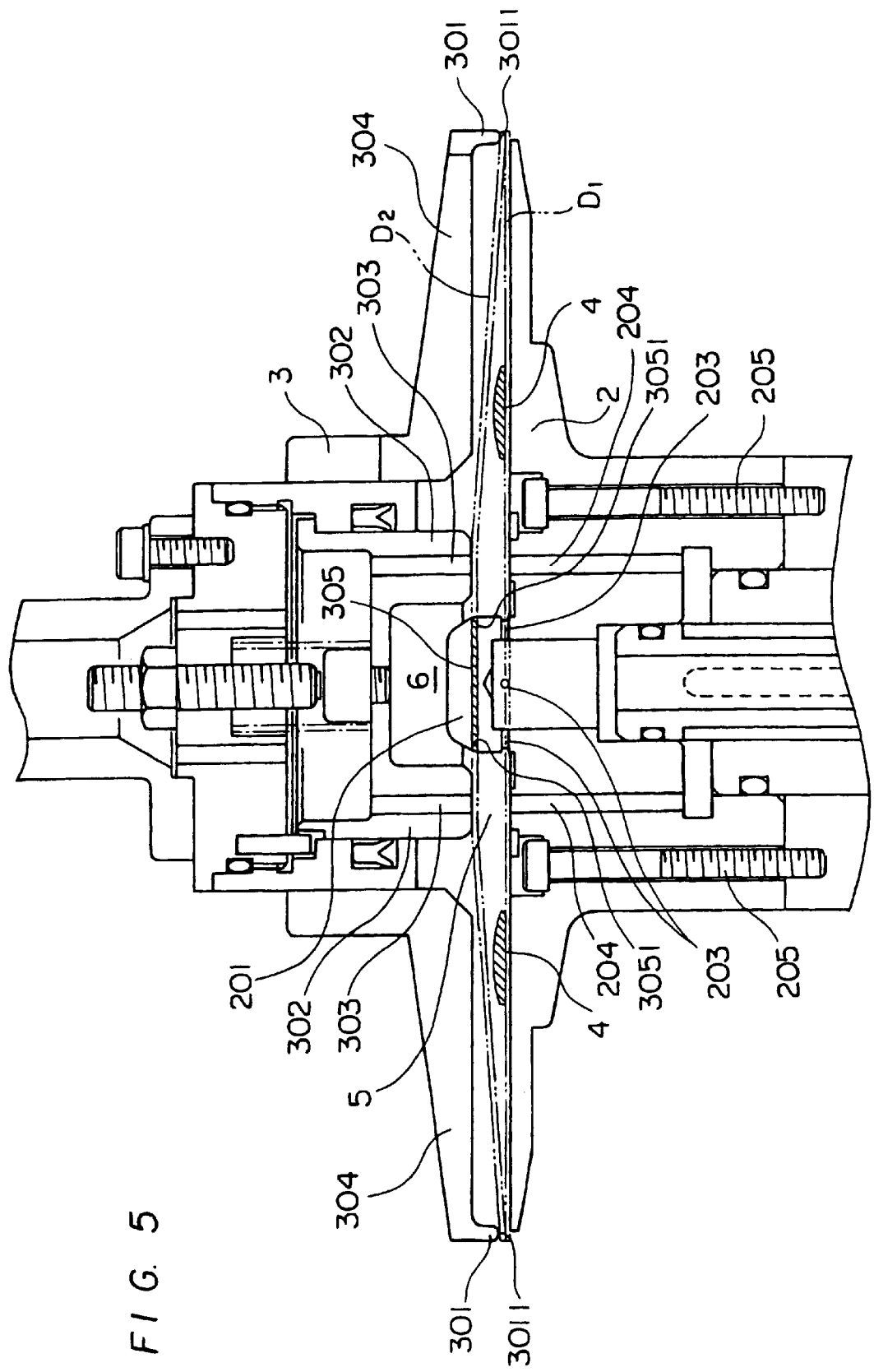

That is, as shown in FIG. 5, the second disk D2 swelled upward and held by the arm 3 is overlapped on the first disk with its center position aligned with that of the first disk D1, wherein only the outside portions D1a and D2a of both disks D1 and D2 are brought into contact with each other, and a closed space like a dish which is upside down, indicated by reference number 5, is formed at the inside area of the disks.

At this time, the inner circumferential wall surface 3051 of the center hole 305 of the second disk is brought into contact with the outer circumferential portion 2011 of the center pin 201 so as not to produce any clearance.

In detail, since flatness of the second disk D2 is maintained at the inside area surrounded by the second disk attracting portion 302, the center hole 305 of the second disk D2 is mounted in the center pin 201 while keeping a right circle, whereby no clearance is produced between the inner circumferential wall surface 3051 and the outer circumferential portion 2011 of the center pin 201.

Also, when closed space 5 is formed, space 6 formed so as to be surrounded by the second disk adsorbing portion 302 at an upper area of the center pin 201 is enclosed. Therefore, even though clearance should be produced between the inner circumferential wall surface 3051 of the center hole 305 the outer circumferential portion 2011 of the center pin 201, it is finally guaranteed that airtightness of the closed space 5 can be maintained.

In order to carry out vacuuming attraction from the vacuuming attraction hole 203 formed at the lower part of the outer circumferential portion 2011 of the center pin 201 facing the interior of the closed space 5, the interior of the closed space 5 instantaneously enters a negative pressure state, thereby forming a vacuum state. Subsequently, as a vacuuming attraction force by the vacuuming attraction hole 203 overcomes an attraction force of the second disk adsorbing portion 302, the second disk D2 is attracted to the first disk D1 side, and is placed on the upper surface of the adhesive agent 4.

Herein, the pasting apparatus 1 is provided with a regulator (not illustrated) to adjust the intensity of the vacuuming attraction force of the negative pressure attraction hole 23 with respect to the disk attraction force of the second disk adsorbing portion 302 of the arm 3.

By providing a regulator and employing a simple means for adjusting the intensity of the vacuuming attraction force, it becomes possible to easily adjust the speed, time and compression force with respect to the adhesive agent 4 when the second disk D2 opposite to the first disk D1 via the closed space 5 is separated from the second disk attracting portion 302 by the vacuuming attraction of the closed space 5 and is moved to the first disk D1 side.

Also, when the second disk D2 is attracted to the first disk D1 side and is adhered onto the upper surface of the adhesive agent 4, changes in an attraction force of the second disk adsorbing portion 302 can be read by an appointed signal detecting means, whereby the arm 3 is quickly moved upward.

Thereby, interference of the projection 301 outside the arm 3 onto the second disk D2 can be avoided, the second disk D2 can be adhered to and placed on the adhesive agent 4 on the first disk D1 while securing the flatness of the second disk D2, whereby a disk D3 in which two disks D1 and D2 are adhered to and are opposed to each other in parallel can be easily obtained.

Herein, at the moment when the second disk D2 is adhered to and placed onto the adhesive agent 4, the adhesive agent 4 is likely to gather in the center direction of the adhesive agent 4 by its own surface tension itself. Therefore, unless a certain means is provided to secure the flatness of the disks, the tendency may become an obstacle.

Figure 6:
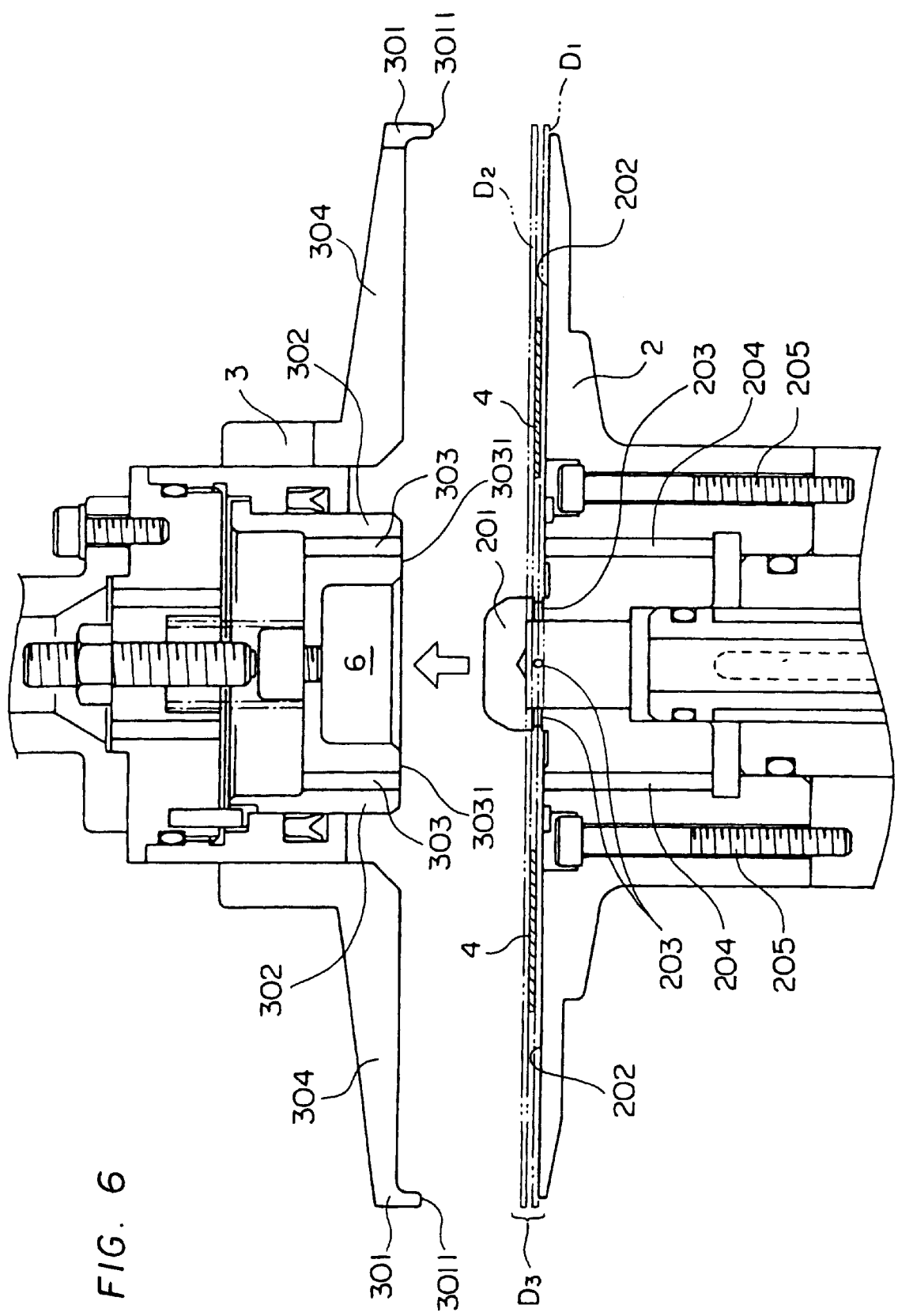
Figure 7:
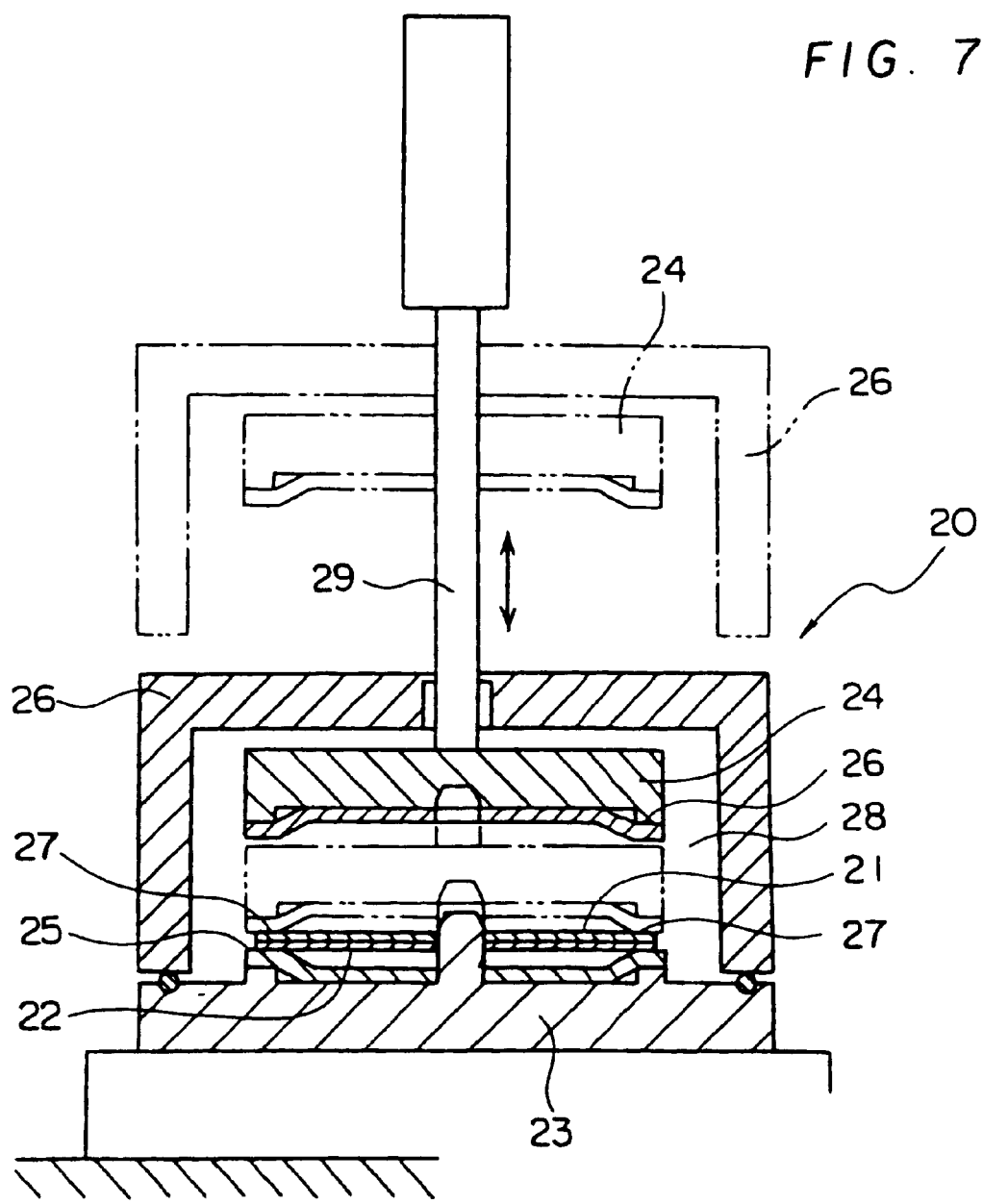
FIG. 7 is a view showing a prior art apparatus for producing pasted disks.
Figure 8:
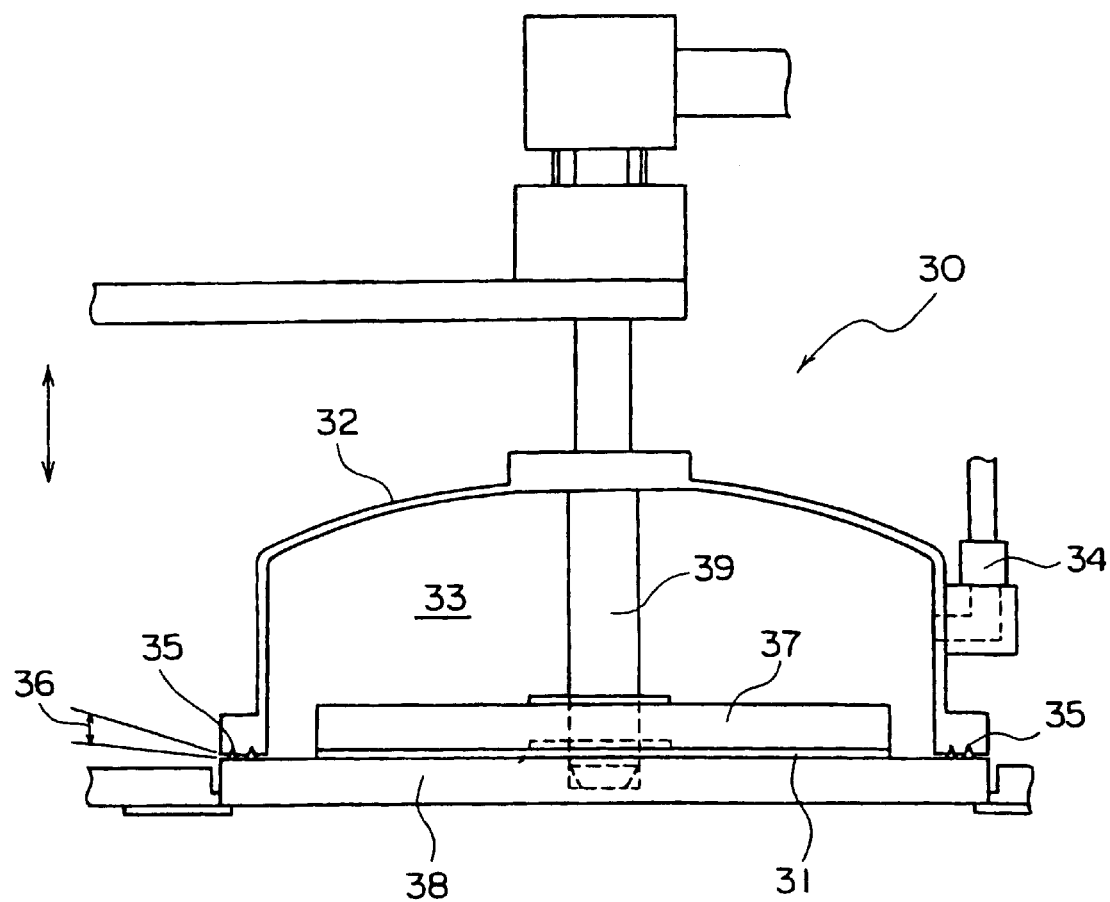
FIG. 8 is a view showing a second prior art apparatus for producing pasted disks that reduces air bubbles from the adhesive agent.
Figure 9:
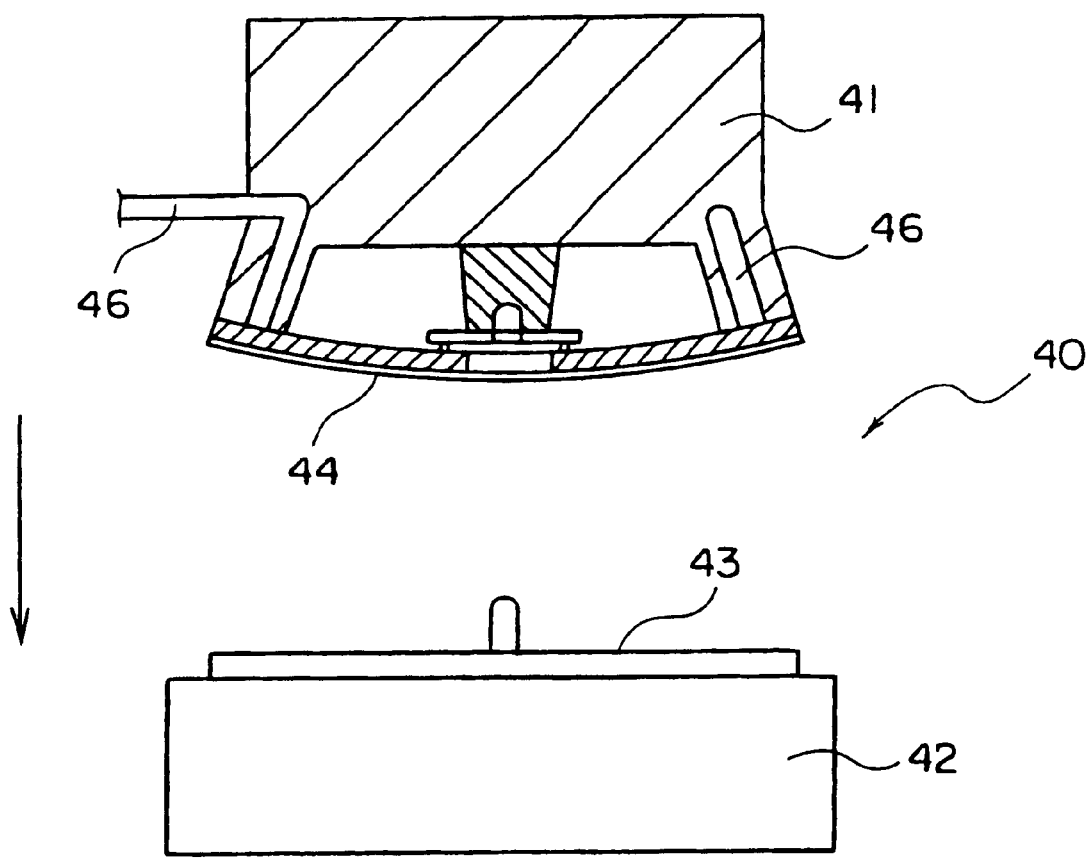
FIG. 9 is a view showing a third prior art apparatus for producing pasted disks that reduces air bubbles from the adhesive agent.

Therefore, the disk table 2 is turned at a high speed from the moment when the second disk D2 is separated from the second disk attraction portion 302 and is placed onto the adhesive agent 4, whereby by its centrifugal force, the adhesive agent 4 is widened to an area having a certain width to such a degree as shown in FIG. 6 in order to make the thickness of the adhesive agent 4 uniform.

By the abovementioned optical disk pasting method, since the capacity of the closed space 5 to be vacuumed and attracted is remarkably small, an effect of vacuuming attraction can be instantaneously displayed, and the second disk D2 is retracted from the position adjacent to the adhesive agent 4 in advance and is placed onto the adhesive agent 4. Accordingly, no air bubble is mixed into the adhesive agent, and flatness of the disks can be secured.

INDUSTRIAL APPLICABILITY

As has been made clear from the above description, since an optical disk pasting apparatus and a pasting method according to the invention prevents air bubbles from being mixed into an adhesive agent and can secure flatness of disks without fail, it is possible to propose high quality optical disks having a high reading accuracy by a laser beam.

Further, since a remarkably simple apparatus and a remarkably simple method, by which vacuuming attraction is carried out by utilizing closed space formed between two disks, it is not completely necessary to provide a large-sized vacuum chamber, whereby it is possible to provide an optical disk pasting apparatus, whose production cost is low and maintenance is easy.

In addition, it is possible to quickly produce an effect of a vacuuming attraction in a closed space since the corresponding closed space to be vacuumed and attracted is remarkably small, and the in-process time in the entire optical disk pasting process can be remarkably shortened, and it contributes to improvement in optical disk production efficiency.

Still further, an adhesive agent to be coated on the first disk has no air bubbles mixed, and is caused to intervene between two disks after being widened to a certain thickness. Therefore, the coating amount of the adhesive agent can be minimized as necessary, amy contributes to a lowering of the production cost.

Therefore, an optical disk pasting apparatus and a method for pasting the same according to the invention contribute to progress in the an optical disk production industry, and provision of high quality optical disks.

What is claimed is:

1. An optical disk pasting apparatus for pasting two optical disks together by overlapping a second disk on an upper surface of a first disk on which an adhesive agent is coated, said optical disk pasting apparatus comprising:
   a first disk holder for supporting the first disk at a bottom surface thereof;
   a second disk holder for holding the second disk relative to the top surface of the first disk, said second disk holder being movable relative to said first disk holder from a rest position to an overlapping position such that respective outer surface areas of the first disk and the second disk are into contact with each other;

first suction means for providing negative pressure to a top surface of the second disk at an area adjacent a central hole of the second disk so as to cause the second disk to elastically deform in a direction opposite the top surface of the first disk such that an enclosed space is formed when the second disk is placed into said overlapping position;

second suction means for supplying negative pressure to said enclosed space to evacuate air therefrom and thereby bringing said second disk into adherence with said first disk; and control means for adjusting the negative pressure supplied by said second suction means with respect to the negative pressure supplied by said first suction means.

2. The optical disk pasting apparatus as set forth in claim 1, wherein said second means includes a center pin mounted adjacent said first disk holder so as to project through a central hole of the first disk and a mechanism for supplying negative air pressure to said center pin.

3. The optical disk pasting apparatus as set forth in claim 2, wherein said center pin includes a plurality of vacuum passages placed equidistant along an outer circumferential portion of said pin.

4. The optical disk pasting apparatus as set forth in claim 3, wherein said plurality of vacuum passages are in fluid communication with said enclosed space when the second disk is in said overlapping position.

5. The optical disk pasting apparatus as set forth in claim 1, wherein said second disk holder includes an auxiliary holder for holding the second disk at an outer circumferential area.

6. The optical disk pasting apparatus as set forth in claim 1, further comprising a sensor for sensing the amount of second negative pressure supplied to the enclosed space.

7. An optical disk pasting apparatus for pasting two optical disks together by overlapping a second disk on an upper surface of a first disk on which an adhesive agent is coated, said optical disk pasting apparatus comprising:

means for evacuating air from an enclosed space created by an elastic deformation of the second disk in a direction opposite to a top surface of the first disk when the second disk is placed into the overlapping position, said means for evacuating air thereby causing the second disk to adhere to the first disk.

8. A method for pasting two disks together by overlapping a second disk on an upper surface of a first disk on which an adhesive agent is coated, said method comprising the steps of:

holding the second disk at a position above the top surface of the first disk;

supplying a first negative pressure to the second disk to elastically deform the second disk in a direction opposite to the top surface of the first disk;

overlapping the disks by bringing an outer surface area of the second disk in contact with an outer surface area of the first disk so as to form an enclosed space therebetween; and then adhering the second disk to the first disk by supplying a second negative pressure to the enclosed space to evacuate air therefrom.

9. The method as set forth in claim 8, further comprising a step of controlling an amount of said second negative pressure with respect to an amount of said first negative pressure so as to overcome an attractive force of the first negative pressure.

10. The method as set forth in claim 9, further comprising a step of sensing an amount of second negative pressure supplied to the enclosed space before the step of controlling the amount of second negative pressure.

11. The method as set forth in claim 9, wherein said overlapping step includes rotating the disks to radially spread the adhesive agent and thereby obtain a uniform thickness of the adhesive agent between the disks.

\* \* \* \* \*